(12) United States Patent
Williamson et al.

(10) Patent No.: US 12,163,638 B2
(45) Date of Patent: Dec. 10, 2024

(54) MODULAR LIGHTING SYSTEMS FOR EXTERIOR SURFACE ARCHITECTURE

(71) Applicant: Magna Exteriors Inc., Aurora (CA)

(72) Inventors: Chris Williamson, Macomb, MI (US); Robert A. Selle, Rochester, MI (US); Daniel Vander Sluis, Rochester Hills, MI (US); Anatoly Gelfand, West Bloomfield, MI (US)

(73) Assignee: Magna Exteriors Inc., Aurora (CA)

( * ) Notice: Subject to any disclaimer, the term of this patent is extended or adjusted under 35 U.S.C. 154(b) by 0 days.

(21) Appl. No.: 18/194,127

(22) Filed: Mar. 31, 2023

(65) Prior Publication Data

US 2023/0313964 A1 Oct. 5, 2023

Related U.S. Application Data

(60) Provisional application No. 63/326,478, filed on Apr. 1, 2022.

(51) Int. Cl.
*F21S 43/14* (2018.01)
*B60Q 1/00* (2006.01)
*B60Q 1/22* (2006.01)
*B60Q 1/44* (2006.01)
*F21S 43/235* (2018.01)

(52) U.S. Cl.
CPC ............ *F21S 43/14* (2018.01); *B60Q 1/0011* (2013.01); *B60Q 1/22* (2013.01); *B60Q 1/44* (2013.01); *F21S 43/235* (2018.01)

(58) Field of Classification Search
CPC ....... B60Q 1/0011; B60Q 1/44; F21S 43/241; F21S 43/235
See application file for complete search history.

(56) References Cited

U.S. PATENT DOCUMENTS

| | | | | |
|---|---|---|---|---|
| 6,527,411 | B1 * | 3/2003 | Sayers | F21S 41/24 362/555 |
| 2016/0061401 | A1 * | 3/2016 | Seyrlehner | F21S 43/241 362/509 |
| 2018/0312102 | A1 * | 11/2018 | Park | F21S 43/50 |
| 2018/0313513 | A1 * | 11/2018 | Park | B60Q 1/20 |
| 2019/0118702 | A1 * | 4/2019 | Shikata | F21S 43/14 |
| 2019/0170311 | A1 * | 6/2019 | Yoon | F21S 41/255 |
| 2021/0188155 | A1 * | 6/2021 | Massa | F21S 41/148 |

\* cited by examiner

*Primary Examiner* — Eric T Eide
(74) *Attorney, Agent, or Firm* — Warn Partners, P.C.

(57) ABSTRACT

A single LED module that can be used in different configurations to provide a customizable vehicle light.

19 Claims, 5 Drawing Sheets

MODULAR LIGHTING SYSTEMS FOR EXTERIOR SURFACE ARCHITECTURE

CROSS-REFERENCE TO RELATED APPLICATIONS

This application is a Non-Provisional patent application and claims benefit of U.S. Provisional Patent Application Ser. No. 63/326,478, filed Apr. 1, 2022. The disclosure of the above application is incorporated herein by reference.

FIELD OF THE INVENTION

The present invention relates to modular lighting systems for exterior surface architecture. The present invention relates to lighting including optical zones utilizing a single cavity such as a hex lit liftgate light.

BACKGROUND OF THE INVENTION

The main goal in this invention is to use a common lighting modular base unit that can be replicated at quantity to create various design options for Exterior Lit Surface Panel Architecture. These lighting zones can be energized as a full array or independently as single base unit. Key advantage of this modular lit architecture is it is driven by the economies of scale of manufacturing and implementing the modular lighting system across multiple platforms can be facilitated with more efficiency.

SUMMARY OF THE INVENTION

In accordance with the present invention there is provided a single LED module that can be used in different configurations. LED light inserts can be customized for providing optical zones utilizing a single cavity such as a hex lit liftgate light.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
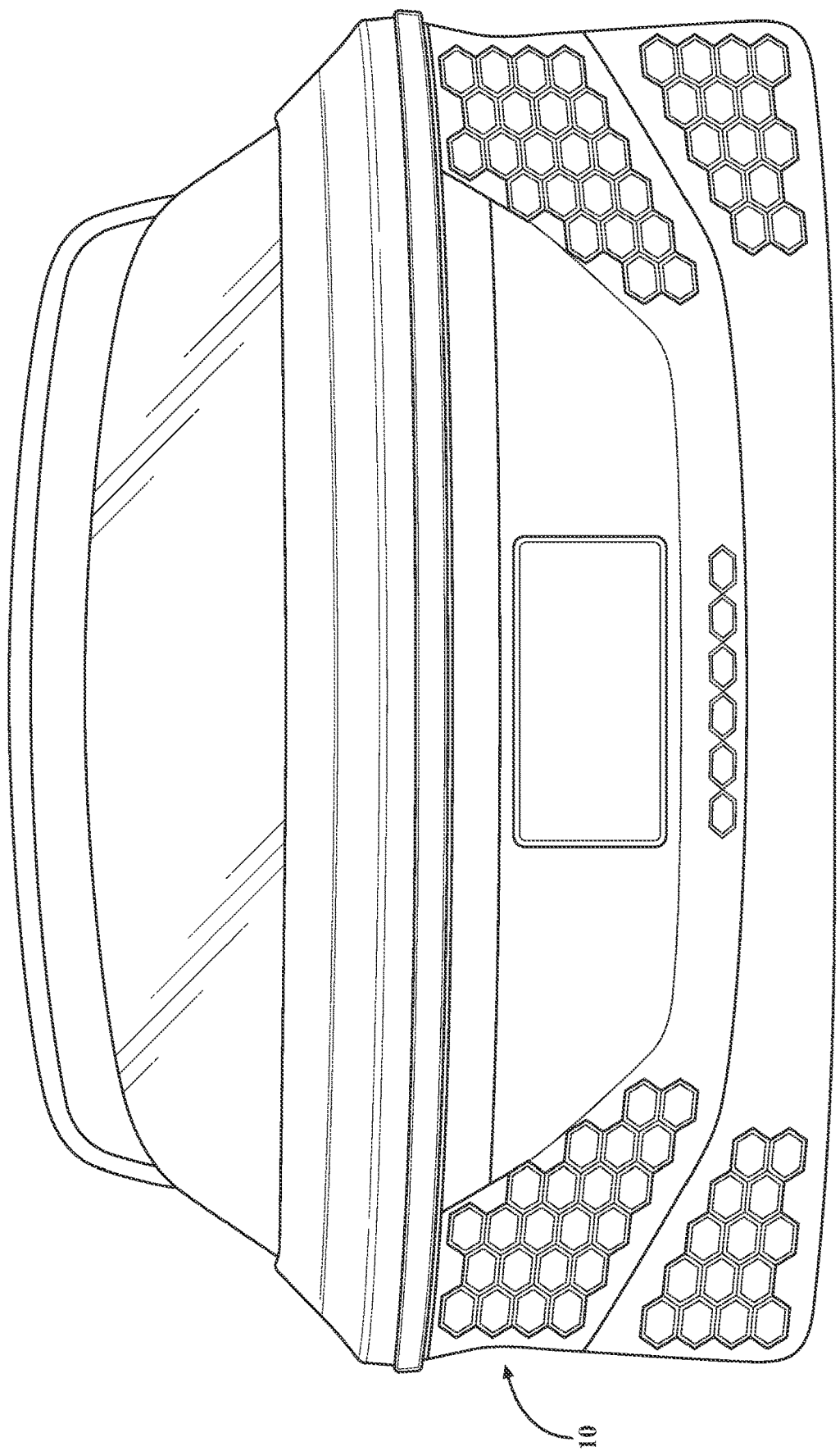
FIG. 1 is a rear view of a vehicle incorporation the lamp module device of the present invention.
Figure 6A:
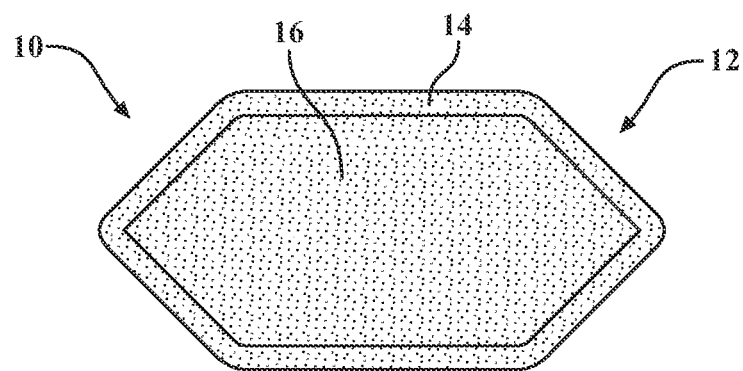
Figure 6B:
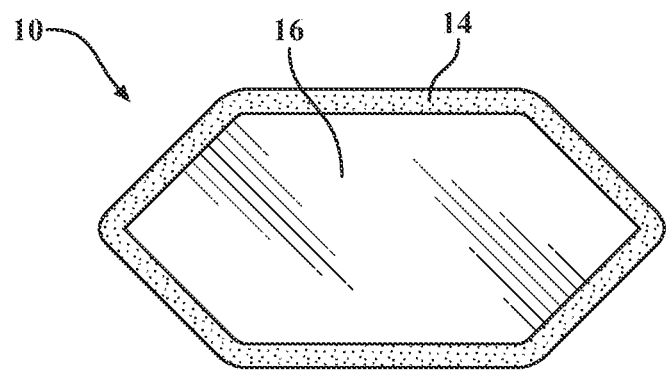
Figure 6C:
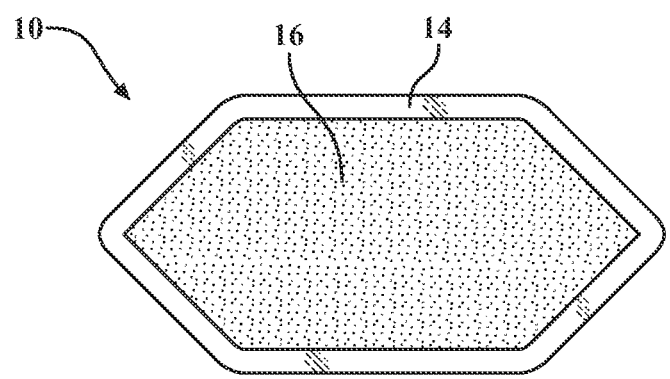

Referring now to the drawings a lamp device made of light modules is generally shown at 10. FIG. 1 shows a group of lamp module devices which can be independently energized or energized together to provide various light patterns. Referring to FIG. 6 a hexagonal shaped module is shown at 12. In this embodiment there is an outer peripheral light pipe edge 14 and inner light area 16.

Figure 2:
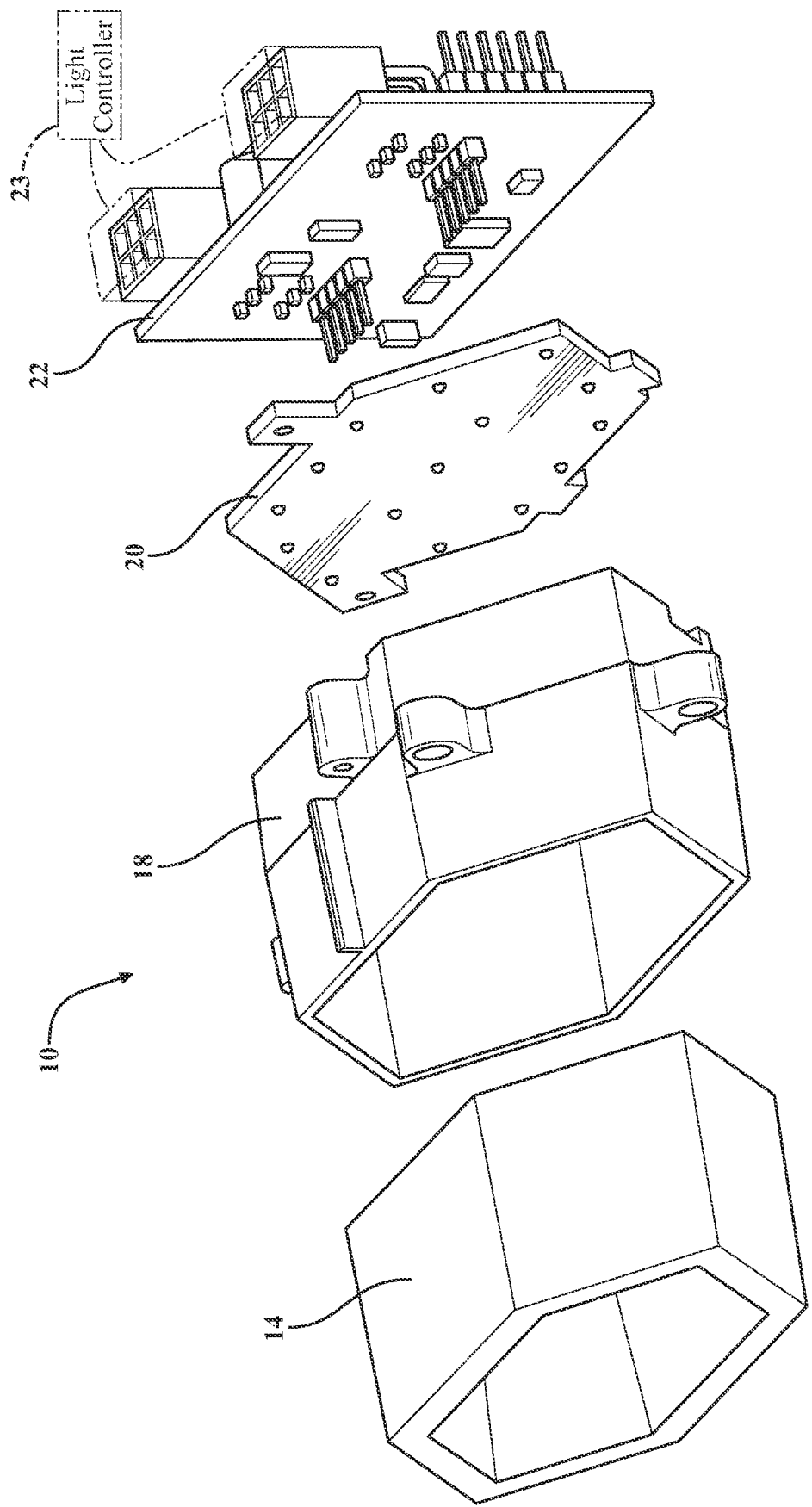
FIG. 2 is an exploded view of a light module device of the present invention.
Figure 4:
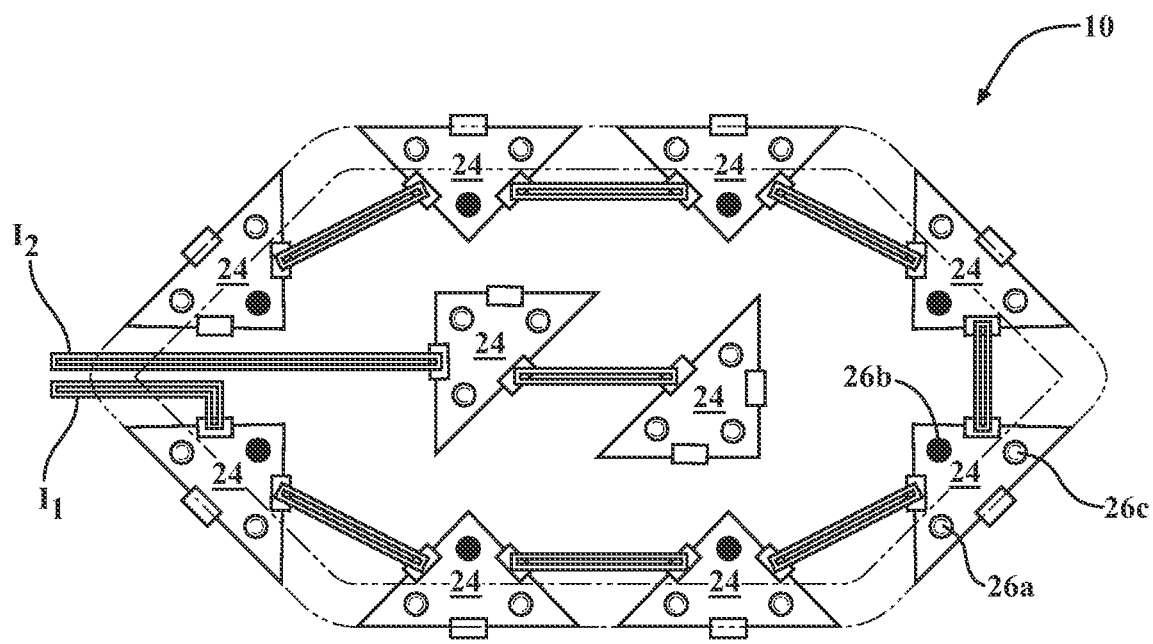
FIG. 4 is a view of the lamp module device showing the interconnection of the LED inserts of the present invention.
Figure 5A:
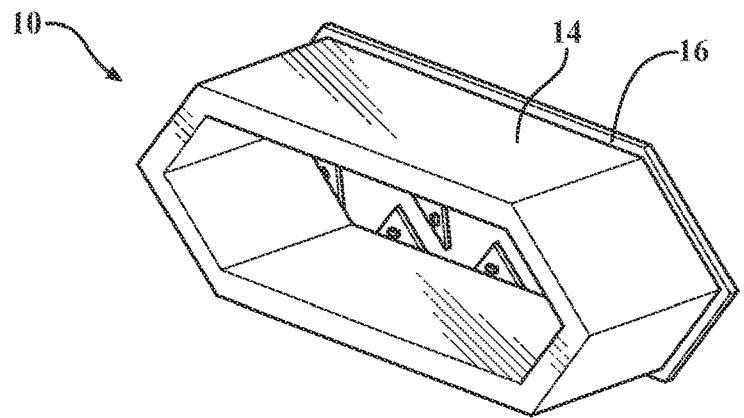
FIG. 5A is a perspective view of an embodiment of the present invention.
Figure 5B:
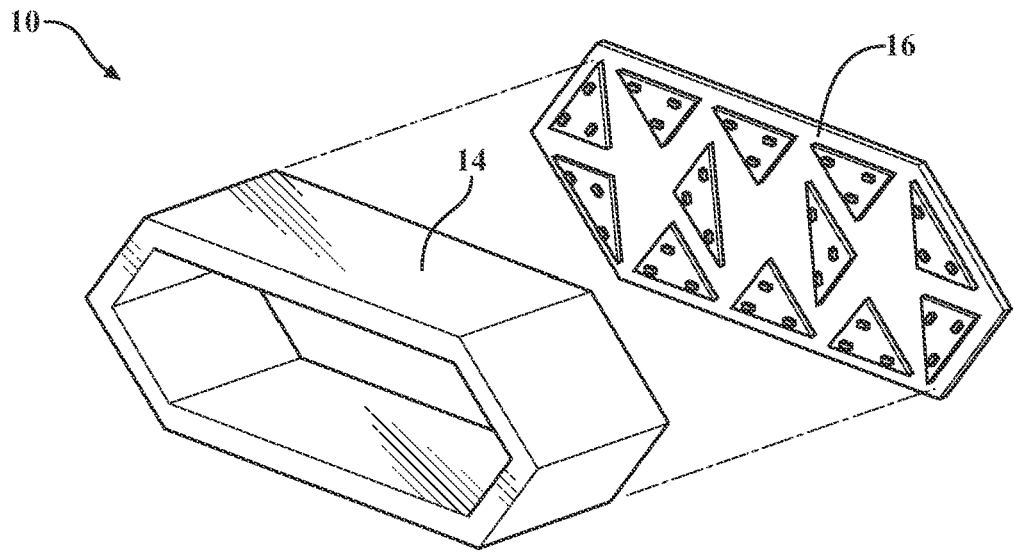
FIG. 5B is an exploded view of an embodiment of the present invention of FIG. 5A.
Figure 5C:
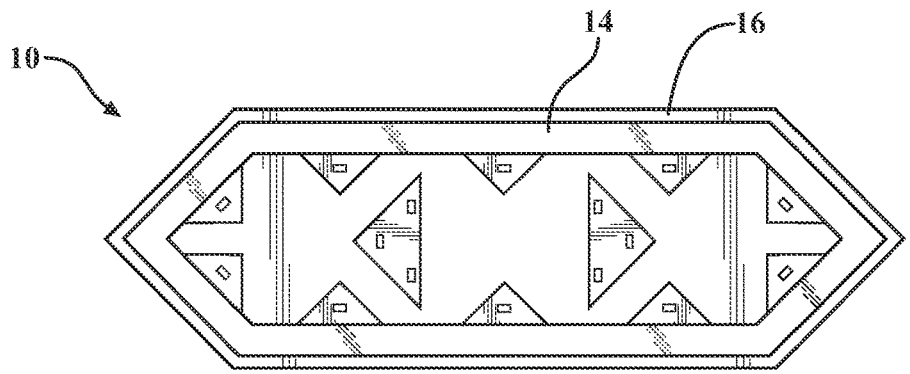
FIG. 5C is a plan view of an embodiment of the present invention of FIG. 5A; and, FIGS. 6A through 6C are illustrative views of lighting effects of the lamp module device of the present invention.

The light module 10 as shown in FIG. 2 includes a light pipe lens 16 a housing 18 an LED board 20 and an LED driver unit 22. As shown in FIG. 4 each light module includes a plurality of interconnectable LED inserts 24 which are installed on the board 20 and connected to the driver 22 to be selectively illuminated. A switch or light controller 23 is provided for control of the lights and illumination circuits. As shown in FIG. 4 two illumination circuits are provided $I_1$ and $I_2$. $I_1$ is linked to LED inserts in the central portion 16 of the module to illuminate that portion. Whereas $I_2$ powers the LED inserts 24 in the outer periphery of the lamp module for purposes of illuminating the outer light pipe portion 16 of the module 10. This illustration shows two Illumination zones $I_1$ and $I_2$, however, it is within the scope of the invention to customize the circuits for illumination of custom graphic such as vehicle logos or the like or to provide custom coloring for brake lights, running lights and backup lighting.

Figure 3:
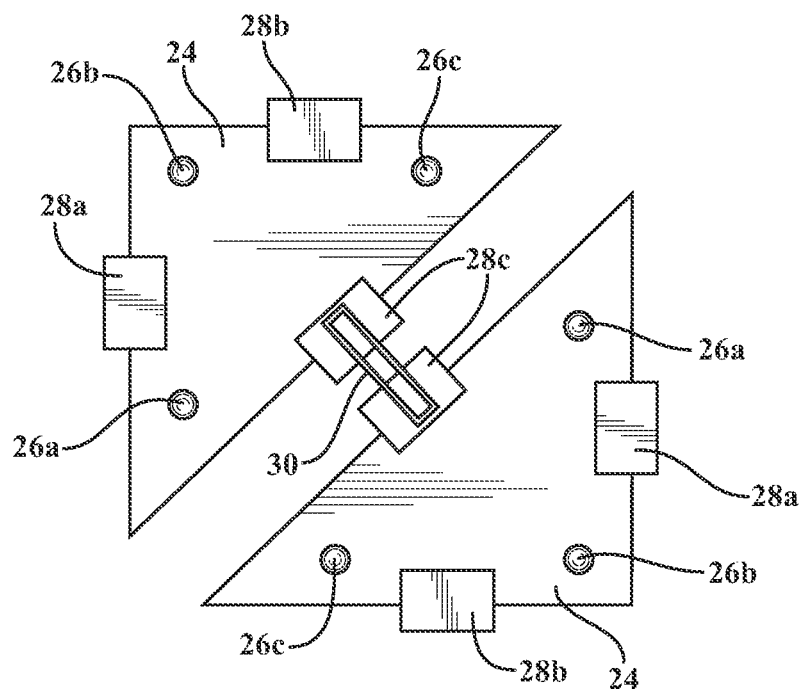
FIG. 3 is a plan view of connectable LED inserts of the present invention.

Referring now to FIG. 3 in one embodiment the modules 24 are triangular in shape and include at least one but typically two or three (3) LED light sources 26a, 26b, and 26c in the apex corners of the triangle shaped modules. Referring to FIG. 4 the light modules used to illuminate the light guide 14 along its linear sides include only two light emitting diodes 26a and 26c for lighting of the outer peripheral light pipe the position of the LED 26b is intentionally left empty or disconnected with these modules Each module also includes male and or female connections on at least one side but typically on each side 28a, 28b, and 28c. This allows each module to be connected by way of wire jumpers 30 or the like for forming predetermined light patterns and circuits. As shown the LED light inserts are designed to fit in the housing by using a 15-millimeter side length. However, it is within the scope of the invention to utilize other shapes and sizes depending on the predetermined desired size and effect of the lamp module.

As shown in FIG. 1 the hexagonal modules can be mounted to or behind translucent or clear body panels in a predetermined array to provide desired light effects to a final vehicle The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A module lamp device, comprising:
    a molded component that allows optical enhancement of light including an inner cavity to reflect the light to the surface in a controlled manner to distribute the light evenly;
    a plurality of independent and distinct interconnectable LED light source modules, each of said independent and distinct interconnectable LED light source modules including a plurality of LED light sources which are interchangeable and interconnectable to provide a customizable light emission;

said molded component including an outer peripheral light pipe comprising an elongated body with internally reflective light guiding surfaces with a base end adjacent to the LED light sources and a distal end spaced from said base end which includes a light emitting outer edge, said light pipe overlying preselected LED's on said connectable LED light source modules for directing light from preselected LED light sources independently into and directing light through the light pipe by way of said inner reflective surfaces to the outer edge of the light pipe or in conjunction with LED light sources in said inner cavity, lighting the inner cavity or lighting both the light pipe and the inner cavity.

2. The lamp module device of claim 1 wherein each module includes a connector portion and a receiver portion, wherein the LED light source modules can be connected together for an illumination pattern circuit.

3. The lamp module device of claim 1 wherein at least two different illumination pattern circuits are provided.

4. The lamp module device of claim 1 wherein each of the modules are triangular in shape.

5. The lamp module device of claim 4 wherein at least one Light emitting device is positioned at an apex of the triangular shaped module.

6. The lamp module device of claim 5 further comprising three light emitting diodes position at each apex of the triangular shaped module.

7. The lamp module device of claim 1 wherein the molded component is hexagonal in shape.

8. The lamp module device of claim 1 further comprising at least one light pipe with inside plating to provide inner and outer light zone separation, wherein said separation includes operably generating independent lighting zones comprising at least said inner and outer zones that selectively allow substantially harmonious appearance when turned on together but maintain crisp zone definition when turned on independently.

9. The lamp module device of claim 1 further comprising at least one single cavity molded part with at least one single optic cavity, said single cavity molded part operable to distribute light into zones which selectively provides predetermined harmonious appearance at the surface when any single zone is illuminated and when all zones are illuminated at the same time.

10. The lamp module device of claim 1 where in at least one side of each of the LED light source modules includes one male or female electrical connection which can be electrically connected to a corresponding male or female electrical connection of another light module.

11. The lamp module device of claim 10 wherein at least one side of each of the LED light source modules includes both a male and female connection.

12. The lamp module device of claim 1 wherein each side of each light module has a male or female connection.

13. The lamp module of claim 1 wherein each side of each light module has a male and female connection which passes electrical current to a corresponding light module to which it is connected.

14. The lamp module of claim 1 wherein each of the modules are triangular in shape and two light emitting diodes are provided on at two apexes of the triangle to provide linear lighting for illumination of said light pipe.

15. The lamp module device of claim 7 wherein a plurality of hexagonal shaped molded components is positioned behind a transparent or opaque vehicle panel for providing a vehicle indicator light.

16. A module lamp assembly for a vehicle comprising a plurality of modules arranged in a predetermined configuration for forming a vehicle light where in each module comprises: a molded component that allows optical enhancement of light including an inner cavity to reflect the light to the surface in a controlled manner to distribute the light evenly and an outer periphery light pipe which includes a light emitting outer edge, and including at least two independent illumination pattern circuits for providing selective lighting of the inner cavity, or the outer edge of the light pipe or both of the inner cavity and the light pipe edge; and a plurality of interchangeable and distinct interconnectable LED triangular shaped light source modules which are interconnectable to provide a customizable light emission which have a preselected number of light emitting diodes positioned in the apex of the triangle shape with at least one LED light source positioned underneath said pipe light guide for illuminating the outer edge of said light pipe and at least one LED light source positioned for illuminating the inner cavity for providing lighting to said inner cavity, said outer edge or both.

17. The module lamp assembly of claim 12 wherein the outer periphery light pipe has a linear area and triangular shaped light source modules for illuminating the outer peripheral light guide have two light emitting diodes which are aligned beneath the linear area of the light pipe.

18. The module lamp assembly of claim 12 wherein the triangular shaped light source modules include a light emitting diode at each of the triangle apex.

19. The module assembly of claim 12 wherein the triangular shaped light modules include at least one light emitting diode for providing illumination.

* * * * *